(12) United States Patent
Kai

(10) Patent No.: US 9,063,853 B2
(45) Date of Patent: Jun. 23, 2015

(54) STORAGE DEVICE, STORAGE SYSTEM, AND METHOD FOR CONTROLLING STORAGE DEVICE

(75) Inventor: Hironori Kai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 13/429,775

(22) Filed: Mar. 26, 2012

(65) Prior Publication Data

US 2012/0311412 A1 Dec. 6, 2012

(30) Foreign Application Priority Data

May 31, 2011 (JP) ................................ 2011-122585

(51) Int. Cl.
*G11C 29/00* (2006.01)
*G06F 11/07* (2006.01)
(Continued)

(52) U.S. Cl.
CPC ........ *G06F 11/0727* (2013.01); *G06F 11/1443* (2013.01); *G06F 11/2094* (2013.01); *G06F 11/0745* (2013.01); *G06F 11/0775* (2013.01); *G06F 11/0784* (2013.01)

(58) Field of Classification Search
CPC ....... G06F 11/0766; G06F 11/10; G06F 7/02; G06F 11/0751; G06F 11/1004; G06F 11/1044; G06F 3/0614; G06F 3/0638; G06F 3/0659; G06F 11/2033; G06F 3/067; G06F 11/2038; G06F 3/0605; G06F 11/0724; G06F 3/0629; G06F 3/0632; G06F 11/1458; G06F 11/1461; G06F 11/1464; G06F 11/0778; G06F 11/2094; G06F 11/1443; G06F 11/0727; G06F 11/0745; G06F 11/0775; G06F 11/0784; H05K 999/99; H04L 1/0061; H04L 67/1097; G11B 20/1833; G11B 19/04; G11B 20/1816; G11B 20/18; Y10S 707/99931
See application file for complete search history.

(56) References Cited

U.S. PATENT DOCUMENTS 5,200,959 A * 4/1993 Gross et al. .................... 714/723
6,084,733 A * 7/2000 Ohzeki et al. .................... 360/53
6,487,677 B1 * 11/2002 Jantz et al. ........................ 714/2
(Continued)

FOREIGN PATENT DOCUMENTS

EP 1 494 118 5/2007
JP 2004-220216 8/2004
(Continued)

*Primary Examiner* — Albert Decady
*Assistant Examiner* — Enamul M Kabir
(74) *Attorney, Agent, or Firm* — Staas & Halsey LLP

(57) ABSTRACT

A storage device disclosed in the present application includes a device-error-codes table, first-information indicating a process-setting that can be changed by a device-state, and second-information indicating a process-setting that is a previously determined by a device-error-type, are associated with each other; a management-unit that adds information indicating a change in the second-information to the second-information stored in the table; a determining-unit that determines the device-error-type; an acquiring unit that acquires, from the table, the first-information; an information-converter that determines whether or not information indicating a change in the second-information, and changes the first-information by the acquiring unit; a transmitter that transmits the first-information by the acquiring unit or changed by the information-converter to a storage-device-controller; and an information-transmitter that receives, from the controller, a request to transmit the second-information and transmits, to the controller, the second-information that corresponds to the request.

3 Claims, 6 Drawing Sheets

(51) Int. Cl.
  *G06F 11/14*  (2006.01)
  *G06F 11/20*  (2006.01)

(56) References Cited

U.S. PATENT DOCUMENTS

| | | | | |
|---|---|---|---|---|
| 2002/0154433 | A1* | 10/2002 | Gill et al. | 360/53 |
| 2002/0166083 | A1* | 11/2002 | Anderson et al. | 714/37 |
| 2004/0093538 | A1* | 5/2004 | Hester et al. | 714/45 |
| 2005/0091051 | A1* | 4/2005 | Moriya et al. | 704/229 |
| 2005/0289553 | A1* | 12/2005 | Miki | 718/104 |
| 2006/0047999 | A1* | 3/2006 | Passerini et al. | 714/6 |
| 2006/0085671 | A1* | 4/2006 | Majni et al. | 714/5 |
| 2006/0117212 | A1* | 6/2006 | Meyer et al. | 714/4 |
| 2007/0168559 | A1* | 7/2007 | Tanaka et al. | 709/246 |
| 2010/0058119 | A1* | 3/2010 | Reid | 714/49 |
| 2010/0211851 | A1* | 8/2010 | Dixon | 714/763 |
| 2012/0144234 | A1* | 6/2012 | Clark et al. | 714/16 |

FOREIGN PATENT DOCUMENTS

| | | |
|---|---|---|
| JP | 2005-25483 | 1/2005 |
| JP | 2006-11581 | 1/2006 |
| JP | 2006-524864 | 11/2006 |
| WO | WO 2004/095287 | 11/2004 |

* cited by examiner

STORAGE DEVICE, STORAGE SYSTEM, AND METHOD FOR CONTROLLING STORAGE DEVICE

CROSS-REFERENCE TO RELATED APPLICATION

This application is based upon and claims the benefit of priority of the prior Japanese Patent Application No. 2011-122585, filed on May 31, 2011, the entire contents of which are incorporated herein by reference.

FIELD

The embodiment discussed herein is related to a storage device, a storage system and a method for controlling the storage device.

BACKGROUND

To date, there has been known a storage system having a plurality of storage devices (for example, disk array devices) and an information processing device, which directs the disk array devices to read or write data therein, connected through a network. The information processing device directing the disk array devices is a server device, for example. Between the information processing device and individual storage devices, various situations such as excessive load of input and output (I/O) and failure of a constituent module and errors of information level may occur. When such a situation occurs, the involved storage device generates an error code representing an error type and transmits the code to the control device.

In addition, the information processing device has a table that associates an error code with a corresponding process to be conducted to cope with such errors. For example, a certain table of the device has error codes associated with a content of an error, the number of retries, and the number of failovers.

Upon receiving the information about errors from the storage device, the information processing device retrieves, from the table, a content of process and conduct the process. For example, the information processing device displays to a user a message representing the received information about an error; retries for a predetermined number of times; and performs a failover for a predetermined number of times. The error codes and corresponding contents to cope with the error are hard-coded in a program to be executed by the information processing device.

Thus, in such a storage system, when a piece of information is added to the error information or when a content of a process to be performed is changed, all programs including the error information have to be modified. Furthermore, the information processing device has to be restarted to execute the modified program.

Japanese National Publication of International Patent Application No. 2006-524864 is an example of the related art.

According to the above technique, however, which causes the information processing device, or the server, to store a content of a process to be conducted, the information processing device selects a process irrespective of the state of storage devices to cope with the error of a storage device. Thus, the information processing device does not conduct an appropriate process based on the state of the storage device. That is, the information processing device selects a process on the basis of an algorithm thereof and does not conduct the process that is appropriate to cope with the error of the storage device.

In addition, according to the technique for causing the information processing device to store the contents of the process to be performed for the error, in order to modify the contents of the process to be conducted when the error occurs, the program is modified and the information processing device is restarted. Thus, there is a problem that content is not efficiently added to the process and the content of the process is not efficiently modified.

Not only dynamic information on a process setting, which can be freely changed based on a state of a storage device at a timing when an error is detected, but also static information on a process setting, which is previously determined based on an error type, may be changed in some cases. The "process setting" is a setting that is used to perform a certain process. Examples of the process settings include values of variables used for the process and the number of times that the process is repeatedly performed. Thus, a message to be output upon sensing may be changed by updating firmware of the storage device. Therefore, there is a demand for the information processing device to detect a change in the static information in order to achieve more adequate error handling. However, when the storage device centrally manages information for error handling, a server may output a previous message because the information processing device does not detect the change in the static information. Thus, it is difficult for the storage system to perform appropriate error handling if the storage system handles a change in the dynamic information without handling a change in the static information.

SUMMARY

According to an aspect of the application, an apparatus includes an error process information table storage unit that stores a table in which error codes that occur in the storage device, first information indicating a process setting that can be changed based on a state of the storage device, and second information indicating a process setting that is previously determined based on an error type, are associated with each other; a update information management unit that adds, when the second information is changed, information indicating a change in the second information to the second information stored in the error process information table storage unit; a determining unit that determines the error type that occurs in the storage device; an acquiring unit that acquires, from the error process information table storage unit, the first information that is associated with the error type determined by the determining unit and stored; an information converter that determines whether or not information indicating a change exists in the second information associated with the error type determined by the determining unit, and changes the first information acquired by the acquiring unit when the information converter determines that information indicating a change exists in the second information so that the changed first information indicates that the second information has been changed; a transmitter that transmits the first information acquired by the acquiring unit to a control device that controls the storage device when the information converter determines that information indicating a change does not exist in the second information, and transmits the first information changed by the information converter to the control device when the information converter determines that information indicating a change exists in the second information; and an information transmitter that receives, from the control device, a request to transmit the second information and transmits, to the control device, a content of the second information that corresponds to the request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, disclosed embodiments of a storage device, a storage system, and a method for controlling the storage device are described with reference to the accompanying drawings, however, the storage device, the storage system, and the method for controlling the storage device are not limited to the embodiments.

Embodiments

Figure 1:
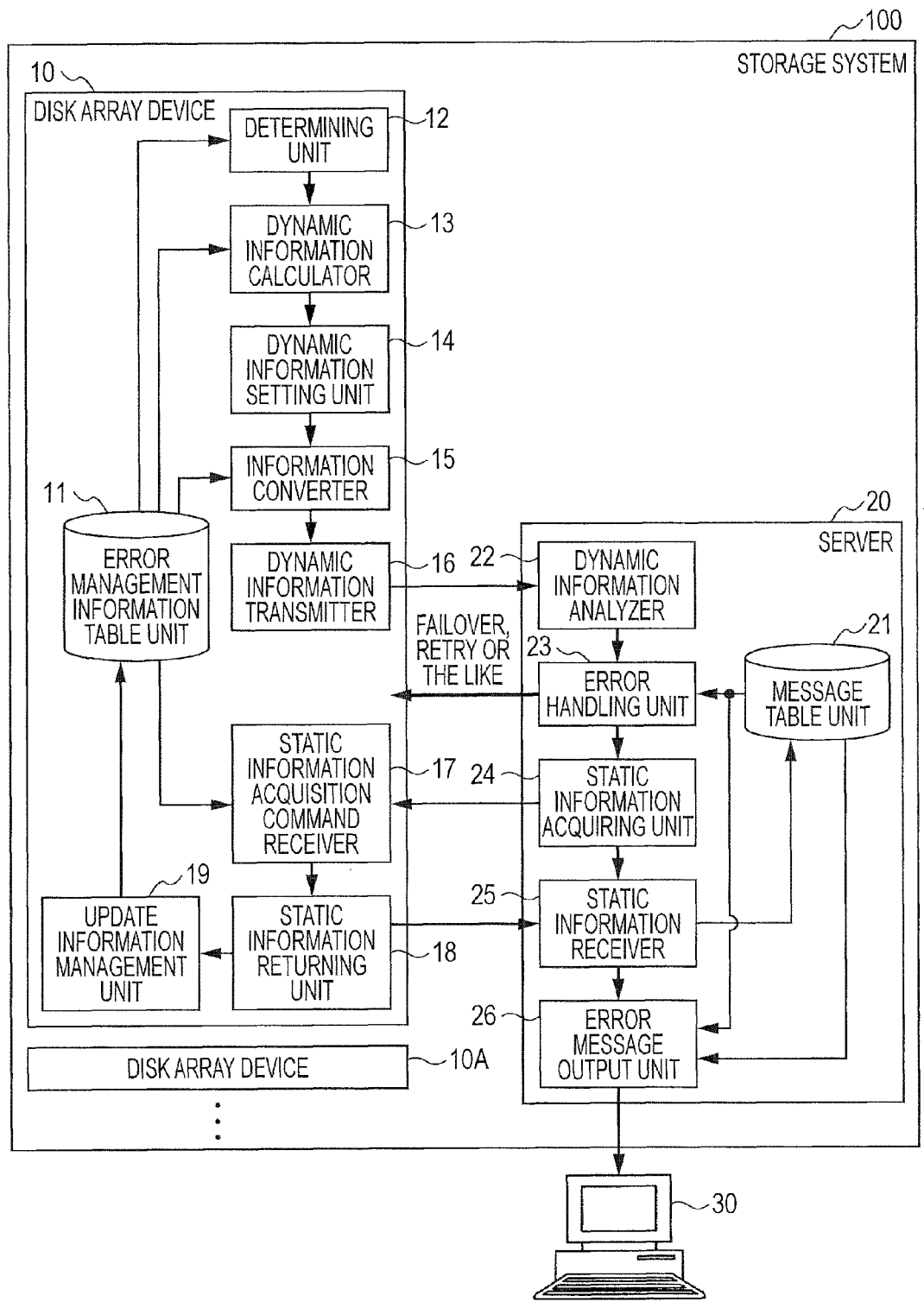
FIG. 1 is a block diagram illustrating a storage system according to an embodiment.

FIG. 1 is a block diagram illustrating a storage system 100 according to the embodiment. As illustrated in FIG. 1, the storage system 100 includes a disk array device 10, a disk array device 10A, and a server 20. In addition, the storage system 100 is connected to a client 30. It is assumed that the disk array device 10, the disk array device 10A, and the server 20 are connected to each other through a network such as a storage area network (SAN).

As illustrated in FIG. 1, the disk array device 10 includes an error management information table unit 11, a determining unit 12, a dynamic information calculator 13, a dynamic information setting unit 14, an information converter 15, a dynamic information transmitter 16, a static information acquisition command receiver 17, a static information returning unit 18, and a update information management unit 19.

The following description assumes that the disk array devices 10 and 10A both include a storage device such as a hard disk drive (HDD) or a solid state drive (SSD) that stores information data, although the storage devices that are included in the disk array devices 10 and 10A are not illustrated in FIG. 1. In addition, the disk array device 10A has the same configuration as the disk array device 10 and performs the same processes as the disk array device 10, and a description thereof is omitted.

First, the above mentioned units 11 to 19 in the disk array device are described below. The error management information table unit 11 stores error types or error codes that occur in the disk array device 10. In addition, the error management information table unit 11 stores information on processes that are performed by the server 20 when the error occurs. The error management information table unit 11 associates the error type with the contents of the processes. The error management information table unit 11 stores data on dynamic and static processes, both being associated with the error code. The content of the dynamic process can be changed on the basis of the state of the disk array device 10 every time an error is detected. The content of the static process is determined in advance for each of the error types.

Specifically, the error management information table unit 11 stores sense information and error handling information while associating the sense information with the error handling information. The sense information indicates the error type, while the error handling information indicates a process that is performed by the server 20 when the error occurs. The error information table unit 11 stores, as the error handling information, the dynamic information that can be changed on the basis of the state of the disk array device 10 when the error is detected. The dynamic information corresponds to "first information". In addition, the error management information table unit 11 stores the static information that indicates process settings that are determined in advance for each of the error types. The static information corresponds to "second information". The sense information includes a sense code and a subsense code.

Figure 2:
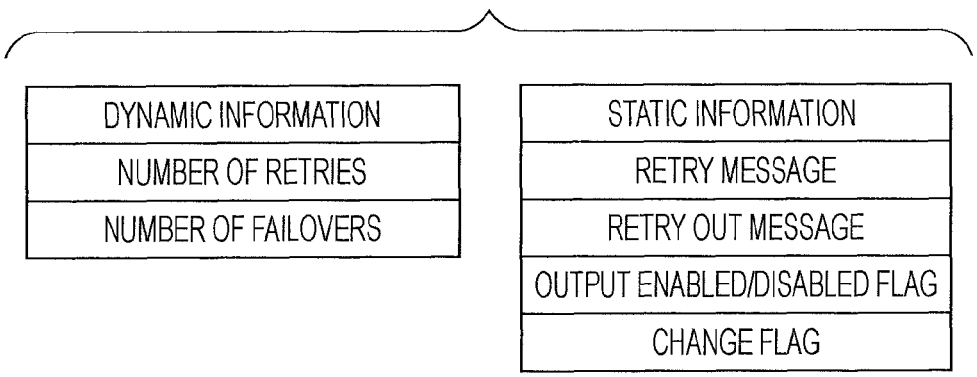
FIG. 2 illustrates examples of dynamic information and static information.

FIG. 2 illustrates examples of the dynamic information and the static information. In this example, the error management information table unit 11 stores the number of retries and the number of failovers as examples of the dynamic information and stores a retry message, a retry out message, an output enabled/disabled flag and a change flag as the static information.

The number of the retries indicates the number of retries that are performed when an error occurs. The number of the failovers indicates an upper limit of the number of times that a failover process of migrating data to an HDD from another HDD in which the error occurs is performed when the error occurs.

The retry message is a message that is displayed on the client 30 every time a retry is performed. In addition, the retry out message that is a message that is displayed on the client 30 when a retry is performed a predetermined number of times for the same path and the retry then continues to be performed for another path. The output enabled/disabled flag is information that indicates whether or not the retry message is displayed on the client 30 every time the retry is performed. For example, when the output enabled/disabled flag is in an "ON" state, an error message output unit 26 (described later) does not display the retry message and displays only the retry out message.

In addition, the change flag is information that indicates whether or not the static information has been changed. For example, when the change flag is in an "ON" state, the dynamic information transmitter 16 (described later) transmits, to the server 20, a notification that indicates that the static information has been changed.

For example, the error management information table unit 11 stores, as the sense information, a sense code "4", a subsense code "2/3", the number "50" (the number of retries performed for the same path) of retries and the number "10" of failovers while associating the sense code "4", the subsense code "2/3", the number "50" of the retries and the number "10" of the failovers with each other. In addition, the error management information table unit 11 stores the sense code "4", the subsense code "2/3" and a retry message "Notice disk Errors" that is a message to be output while associating the sense code "4", the subsense code "2/3" and the retry message "Notice disk Errors" with each other.

In addition, the error management information table unit 11 stores the sense code "4", the subsense code "2/3" and a retry out message "WARN disk not empty" that is a message to be output while associating the sense code "4", the subsense code "2/3" and the retry out message "WARN disk not empty" with each other. The error management information table unit 11 stores the sense code "4", the subsense code "2/3" and the output enabled/disabled flag that is in the "ON" state while associating sense code "4", the subsense code "2/3" and the output enabled/disabled flag in the "ON" state with each other. Furthermore, the error management information table unit 11 stores the sense code "4", the subsense code "2/3" and the change flag that is in the "ON" state while associating sense code "4", the subsense code "2/3" and the change flag in the "ON" state with each other.

Returning to FIG. 1, the determining unit 12 detects an error that occurs in the storage system 100. When the determining unit 12 detects the error, the determining unit 12 determines the detected error type.

When the determining unit 12 detects the error, the dynamic information calculator 13 generates sense information that indicates the error type. In this case, the dynamic information calculator 13 sets a 2-byte additional region to the sense information for the generation of the sense information. Then, the dynamic information calculator 13 transmits the generated sense information to the dynamic information setting unit 14.

The dynamic information calculator 13 acquires, from the error management information table unit 11, dynamic information that is associated with the error type determined by the determining unit 12. Then, the dynamic information calculator 13 changes the acquired dynamic information on the basis of the state of the disk array device 10.

In the present embodiment, the dynamic information calculator 13 searches, from the error management information table unit 11, for error handling information that is associated with the generated sense information. Then, the dynamic information calculator 13 acquires the number of retries and the number of failovers as dynamic information from among the error handling information. Then, the dynamic information calculator 13 determines whether or not another error has occurred in the disk array device 10 or the server 20. When the dynamic information calculator 13 determines that another error has not occurred, the dynamic information calculator 13 notifies the dynamic information setting unit 14 of the acquired numbers of the retries and the failovers.

On the other hand, when the dynamic information calculator 13 determines that the other error has occurred, the dynamic information calculator 13 determines the other error type that has occurred. In addition, the dynamic information calculator 13 generates sense information that indicates the other error type that has occurred. In this case, the dynamic information calculator 13 sets a 2-byte additional region to the generated sense information. Then, the dynamic information calculator 13 transmits the generated sense information to the dynamic information setting unit 14.

The dynamic information calculator 13 searches, from the error management information table unit 11, error handling information that is associated with the generated sense information. Then, the dynamic information calculator 13 acquires, from the searched error handling information, the number of retries and the number of failovers, while the numbers of the retries and the numbers of the failovers are the dynamic information. Specifically, the dynamic information calculator 13 acquires, not only the numbers of the retries and failovers performed for a newly occurred error, but also the numbers of those performed for a previously occurred error.

Then, the dynamic information calculator 13 sums the acquired numbers of the retries. In addition, the dynamic information calculator 13 sums the acquired numbers of the failovers. Then, the dynamic information calculator 13 notifies the dynamic information setting unit 14 of the summed number of the retries and the summed number of the failovers. The number of retries and the number of failovers vary depending on the occurrence of an error of the storage system 100. The dynamic information calculator 13 acquires the numbers of the retries and the numbers of the failovers and notifies the dynamic information setting unit 14 of the summed number of the retries and the summed number of the failovers.

The dynamic information setting unit 14 acquires, from the dynamic information calculator 13, the sense information, the numbers of the retries and the numbers of the failovers. In this case, the sense information includes the error types, while the numbers of the retries and the numbers of the failovers are the dynamic information. Then, the dynamic information setting unit 14 causes the dynamic information acquired from the dynamic information calculator 13 to be stored in the additional regions of the acquired sense information.

Figure 3:
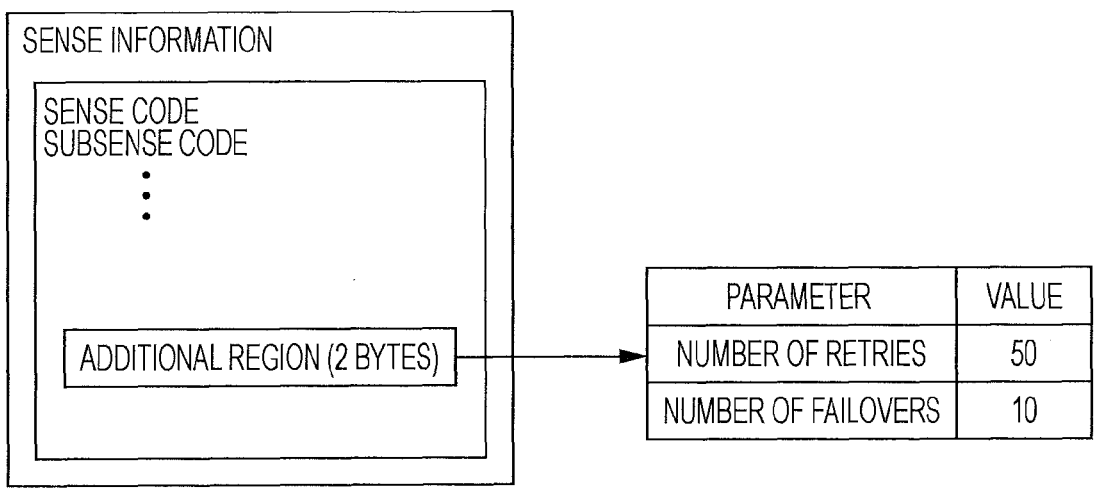
FIG. 3 is a diagram illustrating a process of storing the dynamic information.

FIG. 3 is a diagram illustrating a process of storing the dynamic information. As illustrated in FIG. 3, the dynamic information setting unit 14 causes the error handling information to be stored in the additional region that is set to the sense information. In this case, not all the error handling information is stored in the 2-byte additional region. Thus, the dynamic information setting unit 14 causes the number of retries and the number of failovers to be stored as the error handling information in the additional region of the sense information, while the number of the retries and the number of the failovers are the dynamic information.

After that, the dynamic information setting unit 14 transmits, to the information converter 15, the sense information that stores the dynamic information.

The information converter 15 receives, from the dynamic information setting unit 14, the sense information that stores the dynamic information. In addition, the information converter 15 references the error management information table unit 11 and determines whether or not the change flag for the static information of the received sense information is in the "ON" state. When the change flag is in the "ON" state, the information converter 15 changes a value of the dynamic information described in the additional region of the sense information so that the changed value indicates that the static information has been changed. In the present embodiment, the information converter 15 multiplies the number (illustrated in FIG. 3) of failovers by −1 so as to change the number of the failovers to a negative value. For example, the information converter 15 changes the number (=10) (illustrated in FIG. 3) of the failovers to "−10". In this case, the information converter 15 may not change the number of the failovers and may change the number of the retries. In the present embodiment, in order to easily understand the change in the static information, the number of the failovers is changed to the negative value and thereby indicates that the static information has been changed. The value that represents the static information may be another value as long as the value that represents the static information can be distinguished from the number of the failovers. For example, the information converter 15 reflects a specific value in the number of the failovers. In addition, the information converter 15 uses a certain function f(x) to change the value representing the static information to another value that can be distinguished from the number of the failovers.

When the change flag for the static information is in the "ON" state, the information converter 15 transmits, to the dynamic information transmitter 16, the sense information that has the dynamic information of which the value has been changed and indicates that the static information has been changed. When the change flag for the static information is in an "OFF" state, the information converter 15 transmits, to the dynamic information transmitter 16, the sense information received from the dynamic information setting unit 14 without changing the sense information.

The dynamic information transmitter 16 receives the sense information from the information converter 15. Then, the dynamic information transmitter 16 transmits the received sense information to the server 20.

When the static information acquisition command receiver 17 receives, from a static information acquiring unit 24 (described later) of the server 20, a request to perform a process of transmitting the content of the static process, the static information acquisition command receiver 17 acquires the requested content of the static process from the error management information table unit 11. Specifically, the static information acquisition command receiver 17 receives, from the static information acquiring unit 24 (described later) of the server 20, a static information acquisition command that stores a sense code and a subsense code.

Then, the static information acquisition command receiver 17 analyzes the received static information acquisition command and acquires the sense code stored in the static information acquisition command and the subsense code stored in the static information acquisition command. In addition, the static information acquisition command receiver 17 acquires, from the error management information table unit 11, a message (to be output) and the like that are associated with the acquired sense code and the acquired subsense code. After that, the static information acquisition command receiver 17 transmits the received message (to be output) and the like to the static information returning unit 18.

For example, the static information acquisition command receiver 17 receives, from the server 20, the static information acquisition command that stores the sense code "4" and the subsense code "2/3". In this case, the static information acquisition command receiver 17 acquires, from the error management information table unit 11, the message (to be output) that is associated with the sense code "4" and the subsense code "2/3".

As a result, the static information acquisition command receiver 17 acquires, from the error management information table unit 11, the retry message "Notice disk Errors" and the error message "WARN disk not empty". In addition, the static information acquisition command receiver 17 acquires, from the error management information table unit 11, the output enabled/disabled flag that is in the "ON" state. After that, the static information acquisition command receiver 17 transmits the received static information to the static information returning unit 18.

The static information returning unit 18 transmits, to the server 20, the content (of the static process) acquired by the static information acquisition command receiver 17. Specifically, the static information returning unit 18 receives the static information from the static information acquisition command receiver 17. Then, the static information returning unit 18 transmits the received static information to the server 20. Then, the static information returning unit 18 transmits, to the update information management unit 19, a notification that indicates that the static information returning unit 18 has transmitted the static information to the server 20.

When static information that corresponds to specific sense information is changed by upgrading firmware of the disk array device 10 or the like, the update information management unit 19 sets, to an "ON" state, a change flag for the static information that corresponds to the specific sense information and is stored in the error management information table unit 11. In addition, for example, when a user operates a management device and changes a setting that indicates whether or not an error message is output, the update information management unit 19 changes an "output enabled/disabled flag" for the static information. In this case, since the static information is changed, the update information management unit 19 sets the change flag for the static information to the "ON" state.

When the update information management unit 19 receives the notification that indicates that the static information returning unit 18 has transmitted the static information to the server 20, the update information management unit 19 confirms the change flag for the sense information that corresponds to the interested static information. When the change flag is in the "ON" state, the update information management unit 19 changes the change flag to the "OFF" state.

Figure 4:
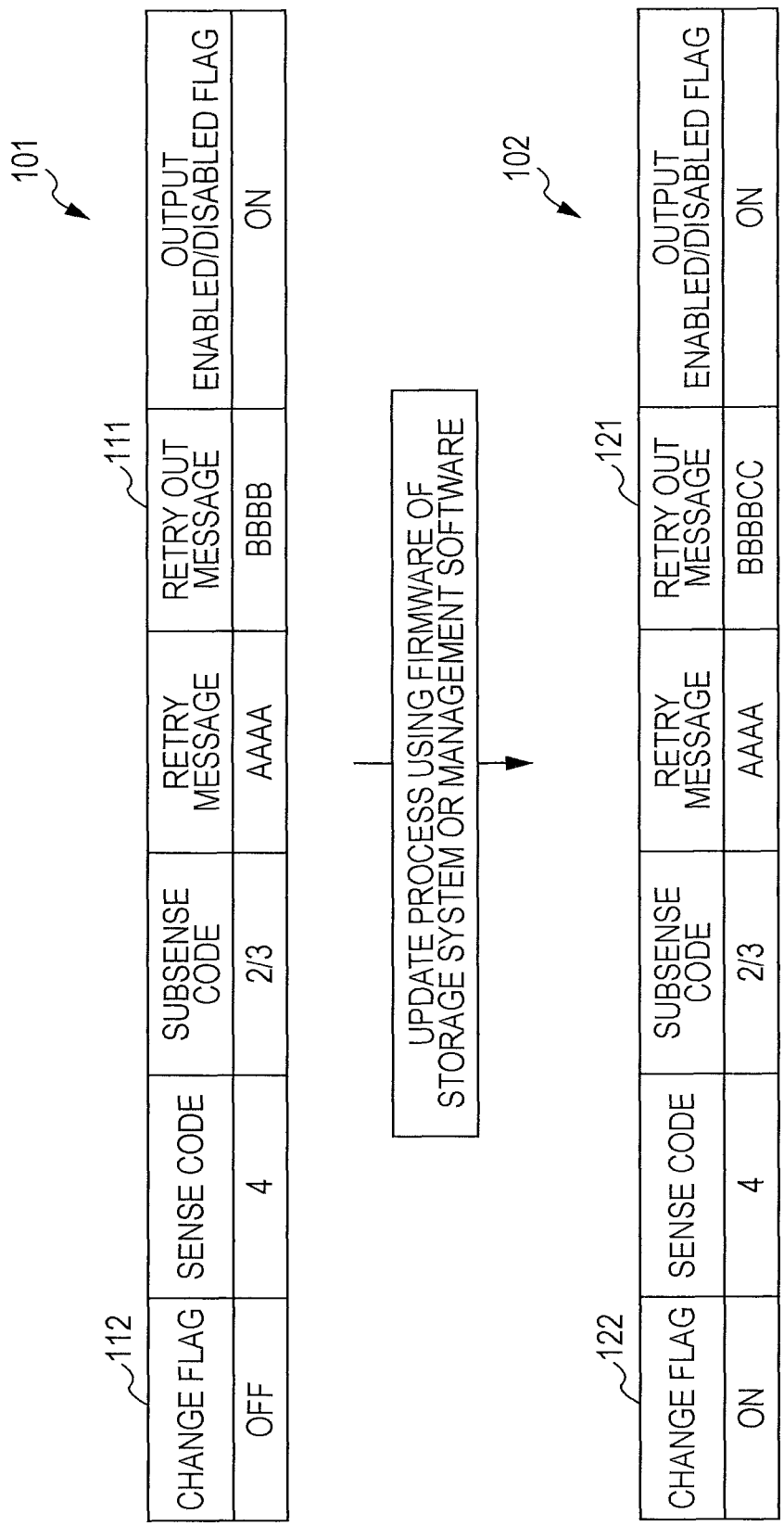
FIG. 4 is a diagram illustrating an example of a change in the static information.

FIG. 4 is a diagram illustrating an example of the change in the static information. Static information 101 is stored in the error management information table unit 11 and is static information before the change, while static information 102 is stored in the error management information table unit 11 and is static information after the change.

As illustrated in FIG. 4, before the change, a change flag 112 that is included in the static information 101 is in an "OFF" state.

A retry out message 111 that is included in the static information 101 has a content that indicates "BBBB" before the change. The retry out message 111 is changed to a retry out message 121 that is included in the static information 102 and indicates "BBBBCC".

In response to the change in the static information, the update information management unit 19 changes the change flag that corresponds to the sense information that has the changed static information so that the change flag becomes the "ON" state as illustrated in FIG. 4.

Next, the server 20 is described. The server 20 includes a message table unit 21, a dynamic information analyzer 22, an error handling unit 23, the static information acquiring unit 24, a static information receiver 25 and an error message output unit 26.

The message table unit 21 stores the error type and the content of the static process while associating the error type with the content of the static process. Specifically, the message table unit 21 stores sense information, a retry message, a retry out message and an output enabled/disabled flag while associating the sense information, the retry message, the retry out message and the output enabled/disabled flag with each other.

For example, the message table unit 21 stores the sense code "4", the subsense code "2/3" and the retry message "Notice disk Errors" while associating the sense code "4", the subsense code "2/3" and the retry message "Notice disk Errors" with each other. In addition, the message table unit 21 stores the sense code "4", the subsense code "2/3" and the error message "WARN disk not empty" that is the output message while associating the sense code "4", the subsense code "2/3" and the error message "WARN disk not empty" with each other. In addition, the message table unit 21 stores the sense code "4", the subsense code "2/3" and the output enabled/disabled flag that is in the "ON" state while associating the sense code "4", the subsense code "2/3" and the output enabled/disabled flag with each other.

When the dynamic information analyzer 22 receives, from the disk array device 10, the sense information that stores the content of the dynamic process, the dynamic information analyzer 22 analyzes the received sense information and acquires the content (of the dynamic process) stored in the sense information. Specifically, when the dynamic information analyzer 22 receives the sense information, the dynamic information analyzer 22 acquires the number of retries, the number of failovers, the sense code and the subsense code, while the number of retries and the number of failovers are stored in the additional region of the sense information.

Then, the dynamic information analyzer 22 determines whether or not the received dynamic information has a value that indicates a change in the static information. In the present embodiment, the dynamic information analyzer 22 determines whether or not the number of failovers is a negative value, and whereby dynamic information analyzer 22 determines whether or not the static information has been changed. Then, when the dynamic information analyzer 22 determines that the static information has been changed, the dynamic information analyzer 22 transmits, to the error handling unit 23, a notification that indicates that the static information has been changed.

Then, when the dynamic information has the value that indicates the change in the static information, the dynamic information analyzer 22 restores the dynamic information so that the value is changed to the original value or the positive value. Then, the dynamic information analyzer 22 notifies the error handling unit 23 of the number of the retries and the number of the failovers. In addition, the dynamic information analyzer 22 notifies the error handling unit 23 of the acquired sense code and the acquired subsense code.

In the present embodiment, since the number of the failovers is changed to the negative value and the dynamic information analyzer 22 notifies the error handling unit 23 of the change in the static information, the dynamic information analyzer 22 acquires the original value by changing the sign of the number of the failovers. However, this operation varies depending on a method for transmitting the notification that indicates the change in the static information. For example, when the dynamic information analyzer 22 transmits static information, in which a variable has been changed based on a certain function, the inverse function is to be used to acquire the original value; and when the dynamic information analyzer 22 transmits the static information, in which a variable has been changed based on a certain value, the disk array device 10 is requested to transmit the original value of the dynamic information.

The error handling unit 23 acquires the number of the retries and the number of the failovers from the dynamic information analyzer 22. Then, the error handling unit 23 performs retries so that the number of the performed retries is equal to the acquired number of the retries. In addition, the error handling unit 23 performs failovers so that the number of the performed failovers is equal to the acquired number of the failovers.

In addition, the error handling unit 23 acquires, from the dynamic information analyzer 22, the sense code and the subsense code, while the sense code and the subsense code are the sense information. When the error handling unit 23 receives, from the dynamic information analyzer 22, the notification that indicates that the static information has been changed, the error handling unit 23 transmits the received sense code and the received subsense code to the static information acquiring unit 24.

On the other hand, when the error handling unit 23 does not receive, from the dynamic information analyzer 22, the notification that indicates that the static information has been changed, the error handling unit 23 determines whether or not the message table unit 21 has, stored therein, the static information that is associated with the received sense code and the received subsense code.

When the error handling unit 23 determines that the message table unit 21 has, stored therein, the static information that is associated with the received sense information, the error handling unit 23 transmits the received sense code and the received subsense code to the error message output unit 26.

On the other hand, when the error handling unit 23 determines that the message table unit 21 does not have the static information that is associated with the received dynamic information, the error handling unit 23 transmits the received sense code and the received subsense code to the static information acquiring unit 24.

When the static information is changed, the static information acquiring unit 24 requests the disk array device 10 to transmit the content of the static process. In this case, the content of the static process is associated with the error type indicated by the received sense information. In addition, even when the error handling unit 23 determines that the message table unit 21 does not have the content of the static process, the static information acquiring unit 24 requests the disk array device 10 to transmit the content (of the static process) that is associated with the error type indicated by the received sense information. When the static information acquiring unit 24 requests the disk array device 10 to transmit the content (of the static process) that is associated with the error type indicated by the received sense information, the server 20 does not output an error message to the client 30.

Specifically, when the static information acquiring unit 24 receives the sense code and the subsense code from the error handling unit 23, the static information acquiring unit 24 generates a static information acquisition command so that the static information acquisition command stores the received sense code and the received subsense code. In other words, when the static information is changed or when the error handling unit 23 determines that the message table unit 21 does not have the content (of the static process) that is associated with the received sense information, the static information acquiring unit 24 generates the static information acquisition command.

Then, the static information acquiring unit 24 transmits the generated static information acquisition command to the static information acquisition command receiver 17 of the disk array device 10 and thereby requests the disk array device 10 to transmit the static information. In addition, the static information acquiring unit 24 transmits the sense code (received from the error handling unit 23) and the subsense code (received from the error handling unit 23) to the static information receiver 25. When the static information acquiring unit 24 transmits the static information acquisition command to the static information acquisition command receiver 17, the server 20 performs queuing for an I/O section 260 and does not return an error to an upper program.

The static information receiver 25 receives a content (of the static process) requested by the static information acquiring unit 24. Then, the static information receiver 25 associates the received content of the static process with the error type and causes the content of the static process and the error type to be stored in the message table unit 21.

Specifically, the static information receiver 25 receives the retry message, the retry out message and the output enabled/disabled flag from the static information returning unit 18. In addition, the static information receiver 25 receives the sense code and the subsense code from the static information acquiring unit 24.

Then, the static information receiver 25 associates the received retry message, the received retry out message and the received output enabled/disabled flag with the received sense code and the received subsense code and causes the received retry message, the received retry out message, the received output enabled/disabled flag, the received sense code and the received subsense code to be stored in the message table unit 21. After that, the static information receiver 25 transmits the sense code (received from the static information acquiring unit 24) and the subsense code (received from the static information acquiring unit 24) to the error message output unit 26.

For example, the static information receiver 25 receives the retry message "Notice disk Errors", the retry out message "WARN disk not empty" and the output enabled/disabled flag that is in the "ON" state. In addition, the static information receiver 25 receives the sense code "4" and the subsense code "2/3". Then, the static information receiver 25 associates the sense code "4" and the subsense code "2/3" with the received retry message, the received retry out message and the received output enabled/disabled flag and causes the sense code "4", the subsense code "2/3", the received retry message, the received retry out message and the received output enabled/disabled flag to be stored in the message table unit 21.

When the error handling unit 23 determines that the message table unit 21 does not have the static information, the error message output unit 26 performs the content (of the static process) received by the static information receiver 25. On the other hand, when the error handling unit 23 determines that the message table unit 21 has, stored therein, the static information, the error message output unit 26 performs the content (of the static process) stored in the message table unit 21.

Specifically, when the error message output unit 26 receives the sense code and the subsense code from the static information receiver 25, the error message output unit 26 acquires, from the message table unit 21, the static information that is associated with the received sense code and the received subsense code. Then, the error message output unit 26 outputs the static information acquired from the message table unit 21.

In addition, when the error message output unit 26 receives the sense code and the subsense code from the error handling unit 23, the error message output unit 26 acquires, from the message table unit 21, the static information that is associated with the received sense code and the received subsense code. Then, the error message output unit 26 outputs at least one of the retry message and the retry out message to the client 30 on the basis of the message enabled/disabled flag that is the acquired static information.

Figure 5:
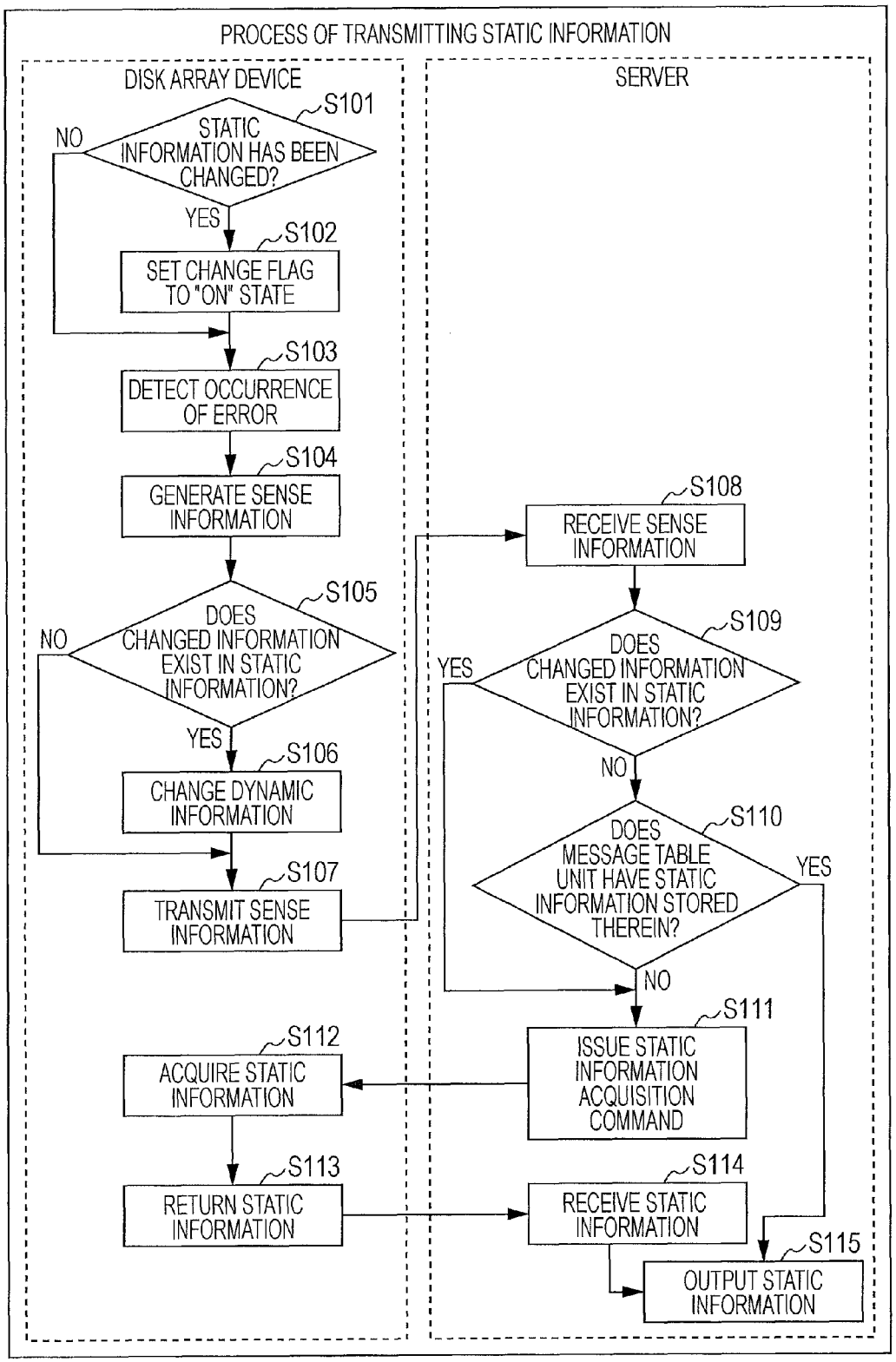
FIG. 5 is a flowchart of a process of transmitting the static information.

Next, the flow of a process that is performed by the storage system 100 to transmit the static information is described with reference to FIG. 5. FIG. 5 is a flowchart of the process of transmitting the static information.

The update information management unit 19 determines whether or not the static information has been changed by upgrading the firmware or the like (in operation S101). When the update information management unit 19 determines that the static information has been changed (Yes in operation S101), the update information management unit 19 sets the change flag for the static information of the interested sense information to the "ON" state (in operation S102). When the update information management unit 19 determines that the static information has not been changed (No in operation S101), the process proceeds to operation S103.

When the determining unit 12 detects the occurrence of an error (in operation S103), the dynamic information calculator 13 calculates the number of retries and the number of failovers. Then, the dynamic information setting unit 14 generates sense information that includes the number (calculated by the dynamic information calculator 13) of the retries and the number (calculated by the dynamic information calculator 13) of the failovers and indicates the error type that has occurred (in operation S104).

Next, the information converter 15 confirms the change flag for the static information that corresponds to the error that has occurred, and the information converter 15 determines whether or not the static information has been changed (in operation S105). When the information converter 15 determines that the static information has been changed (Yes in operation S105), the information converter 15 changes the value of the dynamic information so that the changed value indicates that the static information has been changed (in operation S106). On the other hand, when the information converter 15 determines that the static information has not been changed (No in operation S105), the process proceeds to operation S107.

After that, the dynamic information transmitter 16 transmits the generated sense information to the dynamic information analyzer 22 of the server 20 (in operation S107).

When the dynamic information analyzer 22 receives the sense information (in operation S108), the dynamic information analyzer 22 determines whether or not the value that indicates the change in the static information is included in the received sense information (in operation S109).

When the value that indicates the change in the static information is not included in the sense information (No in operation S109), the dynamic information analyzer 22 determines whether or not the message table unit 21 has, stored therein, the static information that is associated with the sense information (in operation S110).

When the message table unit 21 has, stored therein, the static information that is associated with the sense information (Yes in operation S110), the error message output unit 26 outputs the static information stored in the message table unit 21 (in operation S115). Specifically, the error message output unit 26 outputs the stored retry message and the stored retry out message on the basis of the stored output enabled/disabled flag.

When the dynamic information analyzer 22 determines that the value that indicates the change in the static information is included in the sense information (Yes in operation S109), the static information acquiring unit 24 issues, to the disk array device 10, a command (static information acquisition command) to acquire the static information (in operation S111). When the message table unit 21 does not have the static information that is associated with the sense information (No in operation S110), the static information acquiring unit 24 issues the static information acquisition command to the disk array device 10 (in operation S111).

Then, the static information acquisition command receiver 17 of the disk array device 10 acquires, from the error management information table unit 11 in accordance with the static information acquisition command, the static information requested by the server 20 (in operation S112).

Then, the static information returning unit 18 transmits the static information acquired by the static information acquisition command receiver 17 to the static information receiver 25 (in operation S113).

After that, the static information receiver 25 of the server 20 receives the static information from the static information returning unit 18 of the disk array device 10 (in operation S114).

Then, the error message output unit 26 causes the received static information to be stored in the message table unit 21 and outputs the received static information to the client 30 (in operation S115).

In the present embodiment, as is apparent from operation S109, when the server 20 receives the dynamic information, the server 20 confirms whether or not the static information has been changed. In addition, in the present embodiment, as is apparent from operation S110, when the server 20 confirms that the static information has not been changed, the server 20 confirms whether or not the message table unit 21 has, stored therein, the interested static information. However, operation S110 may be performed before operation S109. Specifically, when the server 20 receives the dynamic information, the server 20 may confirm whether or not the static information has been changed after the server 20 confirms whether or not the message table unit 21 has, stored therein, the interested static information. In this case, for example, the dynamic information analyzer 22 may not confirm whether or not the static information has been changed, and the error handling unit 23 may confirm whether or not the message table unit 21 has, stored therein, the static information, and then the error handling unit 23 may confirm whether or not the static information has been changed.

Figure 6:
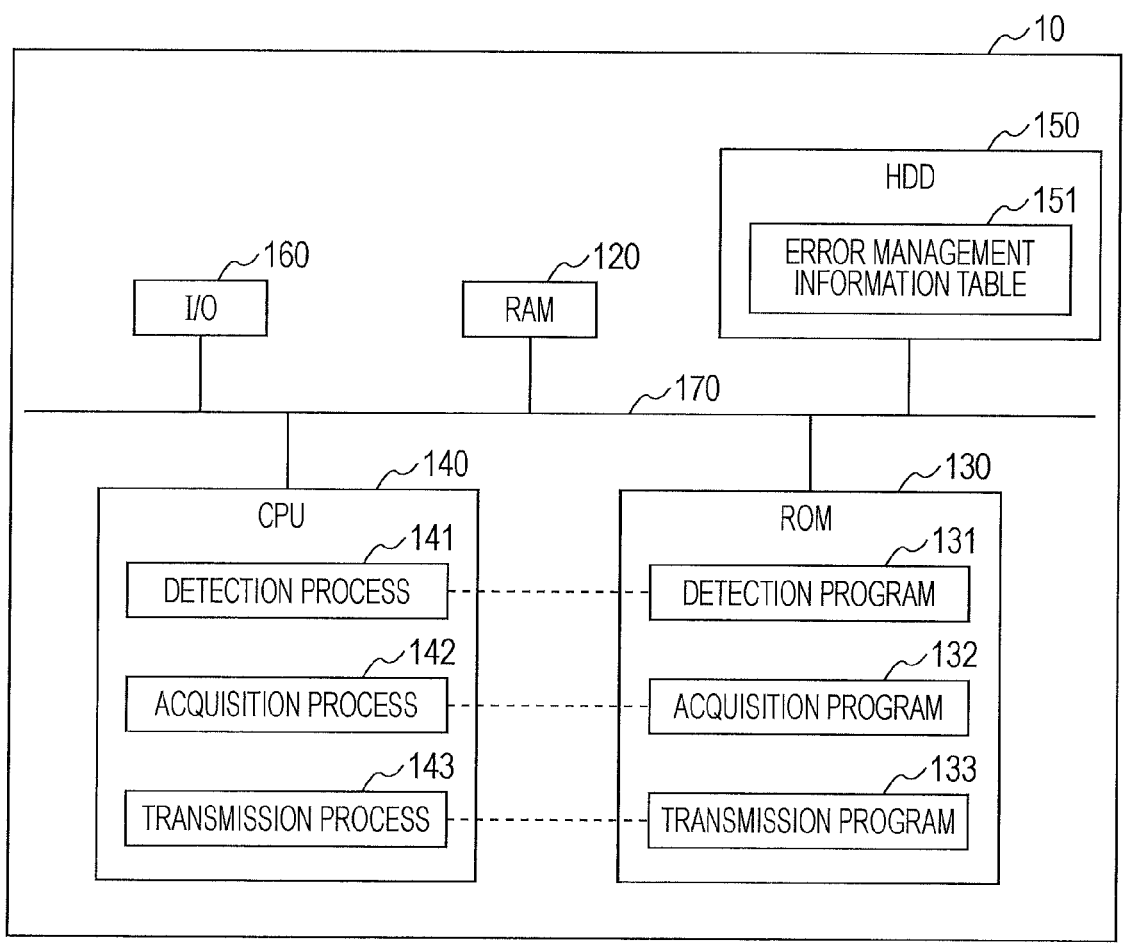
FIG. 6 is a diagram illustrating a hardware configuration of a disk array device.

FIG. 6 is a diagram illustrating a hardware configuration of the disk array device 10. A random access memory (RAM) 120, a read only memory (ROM) 130 and a hard disk drive (HDD) 150 are connected to each other through a bus 170 in the disk array device 10. In addition, a central processing unit (CPU) 140 is connected to the bus 170. Furthermore, an input and output (I/O) section 160 that transmits process information to the server 20 is connected to the bus 170.

The HDD 150 has, stored therein, an error management information table 151 that stores the process information. The error management information table 151 has the same information as the error management information table unit 11 according to the embodiment. The ROM 130 holds a detection program 131, an acquisition program 132 and a transmission program 133. In an example illustrated in FIG. 6, the detection program 131, the acquisition program 132, and the transmission program 133 serve as a detection process 141, an acquisition process 142, and a transmission process 143, respectively. The processes 141 to 143 work as the units 12 to 19 illustrated in FIG. 1.

Figure 7:
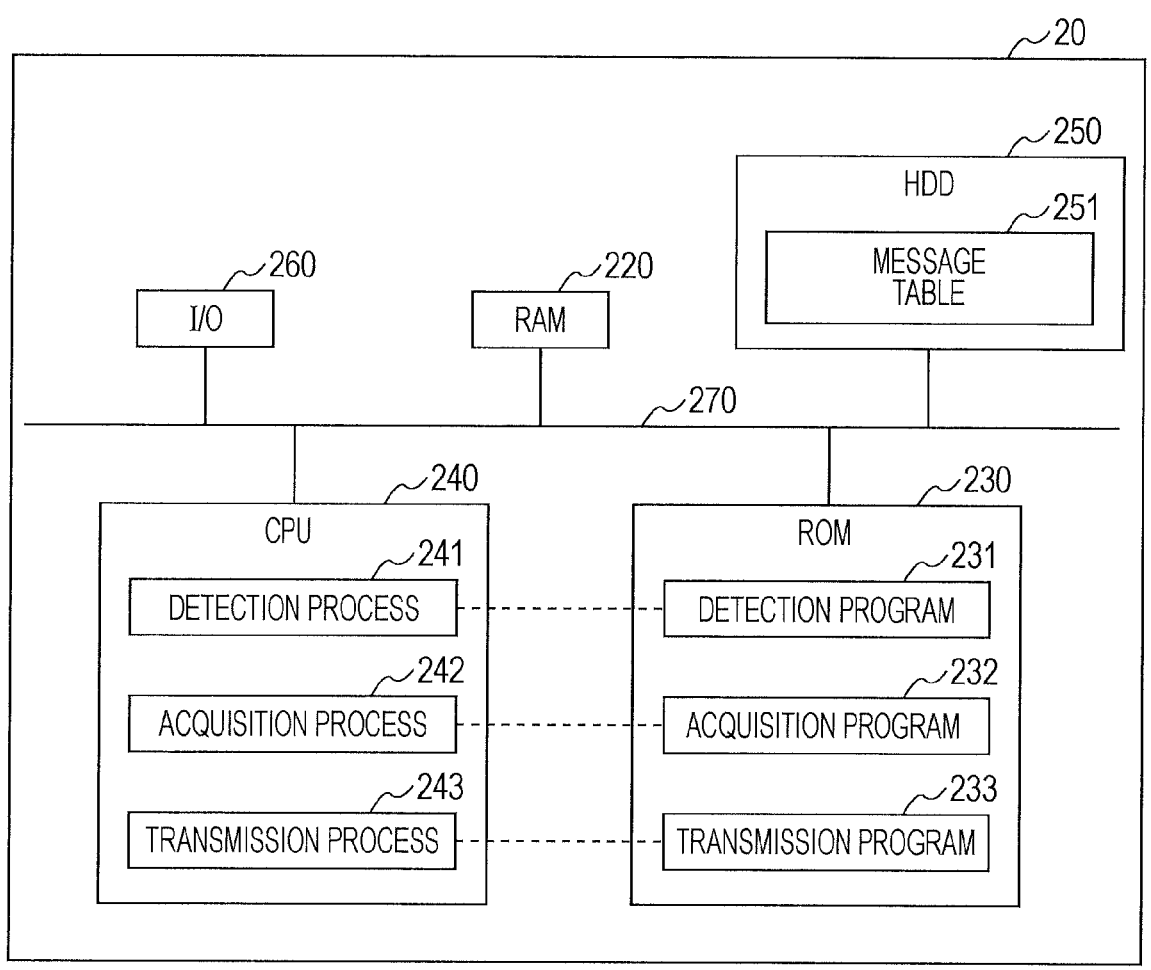
FIG. 7 is a diagram illustrating a hardware configuration of a server.

FIG. 7 is a diagram illustrating a hardware configuration of the server 20. A RAM 220, a ROM 230 and an HDD 250 are connected to each other through a bus 270 in the server 20. In addition, a CPU 240 is connected to the bus 270. Furthermore, the input and output (I/O) section 260 that transmits the process information to the disk array device 10 is connected to the bus 270.

The HDD 250 has a message table 251 storing the process information. The message table 251 has the same information as that in the message table unit 21 of the embodiment. The ROM 230 stores a detection program 231, an acquisition program 232, and a transmission program 233. In an example illustrated in FIG. 7, when the CPU 240 reads and executes the programs 231 to 233 stored in the ROM 230, the programs 231 to 233 function as a detection process 241, an acquisition process 242, and a transmission process 243, respectively. The processes 241 to 243 work as the units 22 to 26 illustrated in FIG. 1.

The process programs can be each achieved by causing a computer (such as a personal computer or a work station) to execute a prepared program. The prepared program can be delivered through a network such as the Internet. In addition, the prepared program is stored in a computer-readable storage medium such as a hard disk, a flexible disk (FD), a compact disc read only memory (CD-ROM), a magneto optical disc (MO) or a digital versatile disc (DVD). In addition, the prepared program can be executed by causing the computer to read the program from the storage medium.

As described above, in the storage system 100 according to the present embodiment, when static information such as an error message is changed, the disk array device 10 uses sense information indicating the occurrence of an error, and transmits a notification that indicates that the static information of the sense information has been changed. Then, the server 20 receives the notification that indicates that the static information has been changed, and the server 20 can acquire the latest changed static information. Thus, the server 20 can quickly detect that the static information has been changed in the storage system 100. In addition, the server 20 can perform a process that is suitable for the changed static information. When the disk array device 10 centrally manages the error handling information, the server 20 can reliably detect the change in the static information. For example, when the retry message or the retry out message is changed, the server 20 can output the new changed message without outputting the message before the change.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device comprising:
an error process information table storage that stores a table, the table including data related to error types that occur in the storage device, dynamic information indicating a process setting that can be changed based on a state of the storage device when an error is detected, and static information indicating a process setting that is determined in advance for each of the error types, the dynamic information and the static information being associated with each other for each error type, the dynamic information including at least one of a number of retries that are performed when the error is detected and a number of failovers that indicates an upper limit of a number of times that a failover process of migrating data to another storage device is performed when the error is detected;
an update information management unit that adds, when the static information is changed, information indicating a change in the static information to the static information stored in the error process information table storage;
a determining unit that determines an error type that occurs in the storage device;
an acquiring unit that acquires, from the error process information table storage, the dynamic information that is associated with the error type determined by the determining unit;

an information converter that determines whether or not information indicating a change exists in the static information associated with the error type determined by the determining unit, and changes the dynamic information acquired by the acquiring unit when the information converter determines that information indicating a change exists in the static information so that the changed dynamic information indicates that the static information has been changed, the information converter reversibly changing the dynamic information by multiplying at least one of the number of retries and the number of failovers by −1 so that the changed dynamic information has a negative value;

a transmitter that transmits the dynamic information acquired by the acquiring unit to a control device that controls the storage device when the information converter determines that information indicating a change does not exist in the static information, and transmits the dynamic information changed by the information converter to the control device when the information converter determines that information indicating a change exists in the static information; and an information transmitter that receives, from the control device, a request to transmit the static information and transmits, to the control device, a content of the static information that corresponds to the request.

2. A storage system comprising:

a storage device that stores information; and a control device that controls the storage device, wherein the storage device includes:

an error process information table storage that stores a table, the table including data related to error types that occur in the storage device, dynamic information indicating a process setting that can be changed based on a state of the storage device when an error is detected, and static information indicating a process setting that is determined in advance for each of the error types, the dynamic information and the static information being associated with each other for each error type, the dynamic information including at least one of a number of retries that are performed when the error is detected and a number of failovers that indicates an upper limit of a number of times that a failover process of migrating data to another storage device is performed when the error is detected;

a update information management unit that adds, when the static information is changed, information indicating a change in the static information to the static information stored in the error process information table storage;

a determining unit that detects an error occurring in the storage device and determines an error type of the detected error;

an acquiring unit that acquires, from the error process information table storage, the dynamic information that is associated with the error type determined by the determining unit;

an information converter that determines whether or not information indicating a change exists in the static information associated with the error type determined by the determining unit, and changes the dynamic information acquired by the acquiring unit when the information converter determines that information indicating a change exists in the static information so that the changed dynamic information indicates that the static information has been changed, the information converter reversibly changing the dynamic information by multiplying at least one of the number of retries and the number of failovers by −1 so that the changed dynamic information has a negative value;

a transmitter that transmits the dynamic information acquired by the acquiring unit to the control device that controls the storage device when the information converter determines that information indicating a change does not exist in the static information, and transmits the dynamic information changed by the information converter to the control device when the information converter determines that the information indicating a change exists in the static information; and an information transmitter that receives, from the control device, a request to transmit the static information and transmits, to the control device, a content of the static information that corresponds to the request, wherein the control device includes a message table storage that stores the static information;

an information requesting unit that transmits, to the information transmitter, the request to transmit the static information when the dynamic information that is received from the transmitter indicates that the static information has been changed;

an updating unit that receives the static information from the information transmitter and updates the static information in the message table storage to correspond to the received static information; and a controller that controls the storage device so that the storage device performs a process on basis of the dynamic information received from the transmitter and performs a process on basis of the static information that is associated with the dynamic information stored in the message table storage.

3. A method for controlling a storage device that includes an error process information table storage that stores a table, the table including data related to error types that occur in the storage device, dynamic information indicating a process setting that can be changed based on a state of the storage device when an error is detected, and static information indicating a process setting that is determined in advance for each of the error types, the dynamic information and the static information being associated with each other for each error type, the method comprising:

adding, when the static information is changed, information indicating a change in the static information to the static information that is stored in the error process information table storage;

detecting an error occurring in the storage device and determining an error type of the detected error;

acquiring, from the error process information table storage, the dynamic information associated with the determined error type, the dynamic information including at least one of a number of retries that are performed when the error is detected and a number of failovers that indicates an upper limit of a number of times that a failover process of migrating data to another storage device is performed when the error is detected;

determining whether or not information that indicates a change exists in the static information associated with the determined error type;

transmitting, when the information that indicates the change does not exist in the static information, the acquired first information to a control device that controls the storage device;

changing, when the information that indicates the change exists in the static information, the acquired dynamic information by multiplying at least one of the number of retries and the number of failovers by −1 so that the changed dynamic information has a negative value and so that the changed dynamic information indicates that the static information has been changed, and transmitting the changed dynamic information to the control device; and receiving, from the control device, a request to transmit the static information and transmitting, to the control device, a content of the static information that corresponds to the request.

* * * * *